United States Patent
Assaleh et al.

(10) Patent No.: US 6,243,695 B1
(45) Date of Patent: *Jun. 5, 2001

(54) ACCESS CONTROL SYSTEM AND METHOD THEREFOR

(75) Inventors: Khaled Assaleh, Mission Viejo, CA (US); William Michael Campbell, Phoenix, AZ (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/045,361

(22) Filed: Mar. 18, 1998

(51) Int. Cl.[7] .................................................. G06F 15/18
(52) U.S. Cl. ........................................... 706/20; 713/182
(58) Field of Search ............................... 704/246; 706/20; 707/3, 6, 100, 102; 713/182, 183, 185, 186

(56) References Cited

U.S. PATENT DOCUMENTS

| | | | | |
|---|---|---|---|---|
| 4,720,863 | * | 1/1988 | Li et al. ............................... | 704/247 |
| 4,975,960 | * | 12/1990 | Petajan ................................. | 704/251 |
| 5,365,574 | * | 11/1994 | Hunt et al. .......................... | 379/88.02 |
| 5,390,136 | | 2/1995 | Wang .................................... | 364/754 |
| 5,412,738 | * | 5/1995 | Brunelli et al. ...................... | 382/115 |
| 5,519,865 | * | 5/1996 | Kondo et al. ............................. | 707/1 |
| 5,522,012 | * | 5/1996 | Mammone et al. .................. | 704/250 |
| 5,548,647 | * | 8/1996 | Naik et al. ........................... | 704/200 |
| 5,592,589 | | 1/1997 | Poon ...................................... | 395/24 |
| 5,634,087 | * | 5/1997 | Mammone et al. ................... | 706/25 |
| 5,657,424 | * | 8/1997 | Farrele et al. ....................... | 704/255 |
| 5,677,989 | * | 10/1997 | Rabin et al. ......................... | 704/246 |
| 5,687,287 | * | 11/1997 | Ghandi et al. ....................... | 704/247 |
| 5,790,758 | * | 8/1998 | Streit ...................................... | 706/33 |
| 5,819,222 | * | 10/1998 | Smyth et al. ......................... | 704/256 |
| 5,839,103 | * | 11/1998 | Mammone et al. .................. | 704/232 |
| 5,862,519 | * | 1/1999 | Sharma et al. ....................... | 704/231 |
| 5,864,807 | * | 1/1999 | Campbell et al. .................... | 704/244 |
| 5,895,447 | * | 4/1999 | Ittycheriah et al. ................. | 704/231 |
| 5,918,223 | * | 6/1999 | Blum et al. ............................. | 707/1 |
| 5,930,803 | * | 7/1999 | Becker et al. ....................... | 707/104 |
| 5,946,654 | * | 8/1999 | Newman et al. ..................... | 704/246 |
| 6,006,184 | * | 12/1999 | Yamada et al. ...................... | 704/246 |
| 6,058,205 | * | 5/2000 | Bahl et al. ............................ | 382/159 |
| 6,138,115 | * | 10/2000 | Agrawal et al. .......................... | 707/3 |

OTHER PUBLICATIONS

Farrell et al., "Speaker Identification Using Neural Tree Networks", 1994 IEEE Conf. on Acoustics, Speech and Signal Processing 1/165–1/168, Apr. 1994.*

Farrell et al., "Neural Tree Network/Vector Quantization Probability Estimators for Speaker Recognition", Proceedings of the 1994 IEEE Workshop on Neural Networks for Signal Processing, 279–88, Sep. 1994.*

(List continued on next page.)

Primary Examiner—Kakali Chaki
(74) Attorney, Agent, or Firm—Sherry J. Whitney; Gregory J. Gorrie; Maurice J. Jones (57) ABSTRACT

A TCS (200) and procedure (400) for identifying an unidentified class as a class of a group of classes includes a new tree-structured classifier (208) and training processor (204). Unidentified feature vectors representing an unidentified class are combined with predetermined models to compute a score for each of the unidentified feature vectors. Based on the scores for each of the unidentified feature vectors, an association is made with the predetermined models to identify the unidentified class. Predetermined models are created using a training procedure (300) for predetermined feature vectors associated therewith. A procedure (400) for identifying an unidentified class as a class of a group of classes is useful when determining access privileges to a device or system.

8 Claims, 3 Drawing Sheets-

OTHER PUBLICATIONS

Mammone et al., "Speaker Verification Using Phoneme–Based Neural Tree Networks and Phonetic Weighting Scoring Method", Proceedings of the 1995 IEEE Workshop on Neural Networks for Signal Processing 213–22, Aug. 1995.*

Farrell, "Discriminatory Measures for Speaker Recognition", Proceedings of the 1995 IEEE Workshop on Neural Networks for Signal Processing, 143–52, Aug. 1995.*

Mammone et al., "A Subword Neural Tree Network Approach to Text–Dependent Speaker Verification", 1995 International Conf. on Acoustics, Speech, and Signal Processing, 357–60, May, 1995.*

Farrell, "Text–Dependent Speaker Verification Using Data Fusion", 1995 International Conf. on Acoustics, Speech, and Signal Processing, 349–52, May, 1995.*

M. Sharma et al, "Subword–Based Text–Dependent Speaker Verification System with User–Selectable Passwords", 1996 IEEE International Conf. on Acoustics, Speech, and Signal Processing, 93–96, May, 1996.*

Farrell et al., "Sub–Word Speaker Verification Using Data Fusion Methods", Proceedings of the 1997 IEEE Workshop on Neural Networks for Signal Processing, 531–40, Apr. 1994.*

Firesmith et al., Dictionary of Object Technology: The Definitive Desk Reference 57, 89, 90, 184, 1995.*

Merriam Webster's Collegiate Dictionary, Tenth Edition 1129, 1997.*

An article entitled "Speaker Recognition Using Neural Networks And Conventional Classifiers", by Kevin R. Farrell, Richard J. Mammone, and Khaled T. Assaleh, from IEEE 1994.

* cited by examiner

FIG. 5 ations of discriminants which are perpendicular to the feature axes. Also, considering one element at a time is a severe limitation for problems which require more flexibility in the discriminant positioning (e.g., a diagonal discriminant). NTNs have been proposed as a solution for the limitation of discriminants which are perpendicular to the feature axis since NTNs are not constrained to perpendicular discriminant boundaries. However, NTNs are constrained to linear discriminant boundaries which pose limitations for problems having sophisticated class shapes in feature space.

ACCESS CONTROL SYSTEM AND METHOD THEREFOR

FIELD OF THE INVENTION

This invention relates in general to the field of classifiers, in particular to polynomial classifiers and more particularly to tree-structured polynomial classifiers.

BACKGROUND OF THE INVENTION

Software and hardware classifiers are used, among other things, to analyze segments of speech. Classifiers identify which class a particular speech segment belongs. A "class" can be, for example, spoken commands, spoken words, characteristics of a communication channel, modulated signals, biometrics, facial images, and fingerprints.

Modern classifiers use techniques which are highly complex when high accuracy classification is needed. For example, a traditional classifier needing high accuracy also needs large memory and computational resources because of complex polynomial structure. Also, modern classifiers for identifying a user of a system for granting access to the system consume large memory and computational resources while providing modest identification success.

Additionally, higher order polynomial based classifiers are often needed for accurate classification of data which have complicated shapes in feature space. Typical polynomial classifiers have a problem of exponential growth of the number of parameters as the order of the classifier increases. Again, such classifiers have large numbers of parameters which are computationally expensive to compute.

Previous work related to tree-structured classifiers has been in two primary areas, decision trees and neural tree networks (NTN). Typical decision trees consider one element at a time when making a decision. Considering one element at a time constrains the partitioning of the feature space to using discriminants which are perpendicular to the feature axes. Also, considering one element at a time is a severe limitation for problems which require more flexibility in the discriminant positioning (e.g., a diagonal discriminant). NTNs have been proposed as a solution for the limitation of discriminants which are perpendicular to the feature axis since NTNs are not constrained to perpendicular discriminant boundaries. However, NTNs are constrained to linear discriminant boundaries which pose limitations for problems having sophisticated class shapes in feature space.

Thus, what is needed is a system and method requiring less processing and data storage resources to produce improved classification of an unidentified class (e.g., spoken command, communication channel, etc.). What is also needed is a system and method wherein classifiers can achieve high performance classification of sophisticated class shapes in feature space. What is also needed is a system and method for granting access to a system when a user is identified as an approved user of the system.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

The exemplification set out herein illustrates a preferred embodiment of the invention in one form thereof, and such exemplification is not intended to be construed as limiting in any manner.

DETAILED DESCRIPTION OF THE DRAWINGS

The present invention provides, among other things, a system and method requiring less processing and data storage resources to produce improved classification of an unidentified class. The present invention also provides a system and method having a low complexity classifier to classify an unidentified class as a member of a group of classes. The present invention also provides an improved system and method for granting access to a system when a user is identified as an approved user of the system.

A "class" is defined herein to mean a category (e.g., label) provided to a representation of an item. For example, the word "go" is the category (e.g., label) provided to a feature vector representation of a speech sample of an individual speaking the word "go". A "class" may also refer to a category (e.g., label) provided to a group of items (e.g., a multiresolutional classifier). A "class structure" is defined herein to mean a vector. When the vector is a class structure, the vector is a summation of a function (or expansion) of a set of feature vectors which represent the class associated therewith. A "model" is defined herein to mean a vector. When the vector is a class model, the vector has elements which are weighted based primarily on the class associated therewith. A "feature vector" is defined herein to mean a vector which represents the characteristics of an item. For example, when a removed silence speech sample is represented as a set of cepstral coefficients, the cepstral coefficients representing the speech sample are referred to as a "feature vector". Examples of feature vectors include, among other things, spoken language, modulated signals, biometrics, facial images, and fingerprints.

Figure 1:
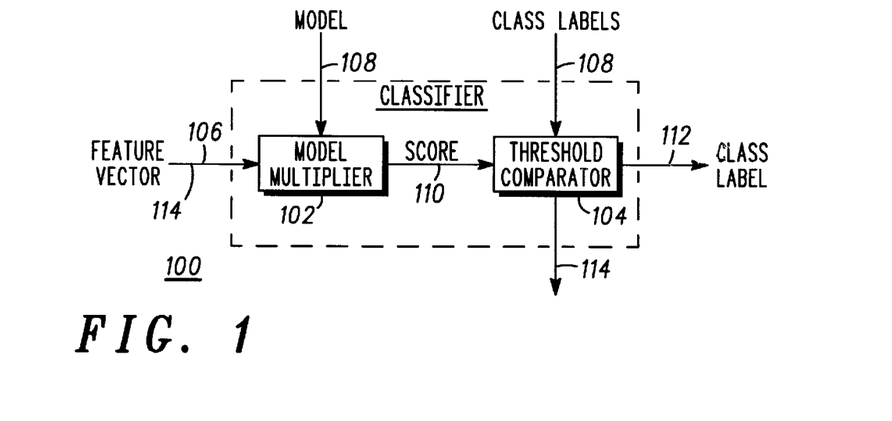
FIG. 1 illustrates a classifier in accordance with a preferred embodiment of the present invention.

FIG. 1 illustrates a classifier in accordance with a preferred embodiment of the present invention. Classifier 100 (FIG. 1) illustrates an apparatus for classifying an unidentified class as at least one of group of classes. In the preferred embodiment, classifier 100 performs a procedure for identifying an unidentified feature vector representing an unidentified class as one of a group of classes. A preferable procedure performed by classifier 100 is discussed below. In the preferred embodiment, classifier 100 is coupled to other classifiers, external databases, and counters. Classifier 100 may be implemented in hardware, software, or a combination of hardware and software; however, classifier 100 is preferably implemented in software.

In the preferred embodiment, classifier 100 is comprised of model multiplier 102 and threshold comparator 104. Model multiplier 102 is preferably coupled to threshold comparator 104. Model multiplier 102 receives models (e.g., vectors) via input 108 and feature vectors (e.g., vectors) via feature vector input 106. Preferably, model multiplier 102 combines models with feature vectors by performing a dot product of the two inputs. Model multiplier 102 preferably determines a score based on a dot product. In the preferred embodiment, a score represents a scalar value equivalent to the result of a dot product performed by model multiplier 102. As described in FIG. 1, a score is represented by score output 110.

Threshold comparator 104 is preferably coupled to model multiplier 102 and via score output 110. In the preferred embodiment, threshold comparator 104 receives class label (e.g., a tag or name) input via input 108. Threshold comparator 104 preferably compares a score to a predetermined threshold to determine a class label. In the preferred embodiment, a predetermined threshold is set at 0.5. Preferably, when a score is less than a predetermined threshold, a first class label is associated with a score. Alternatively, when a score is greater than or equal to a predetermined threshold, a second class label is associated with a score. Preferably, when threshold comparator 104 determines a class label associated with a score, a feature vector is output to feature vector output 114. Similarly, when threshold comparator 104 determines a class label associated with a score, a class label is output to class label output 112.

Figure 2:
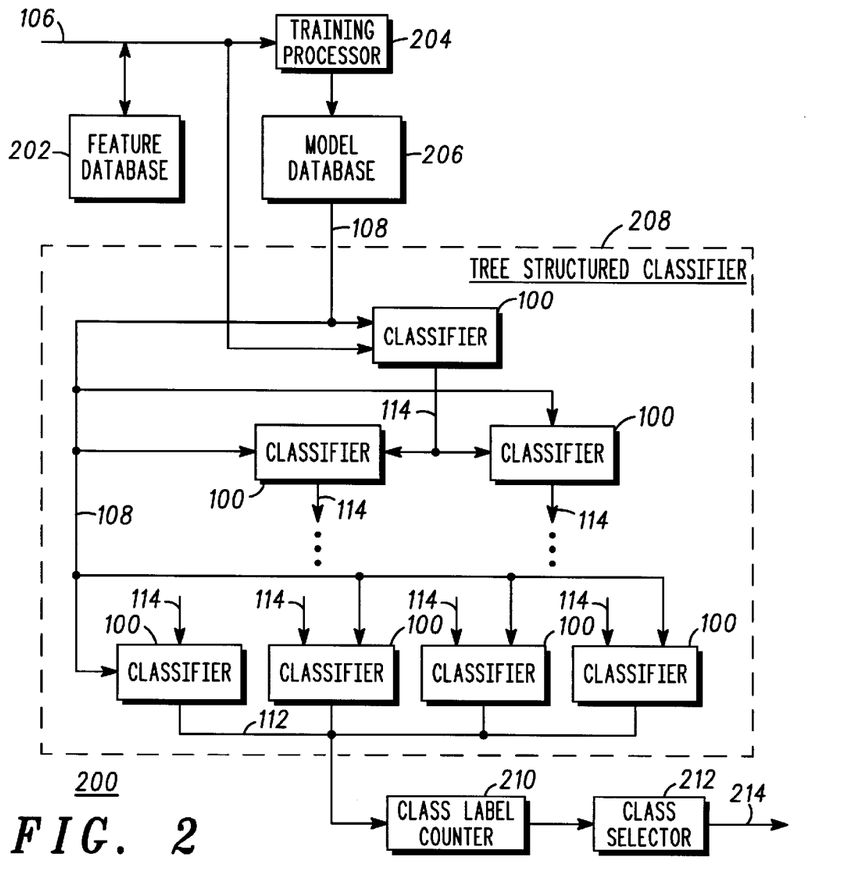
FIG. 2 illustrates a training and classification system in accordance with a preferred embodiment of the present invention.

FIG. 2 illustrates a training and classification system in accordance with a preferred embodiment of the present invention. Training and classification system (TCS) 200 (FIG. 2) illustrates an apparatus for training models and classifying an unidentified class as at least one of a group of classes. In the preferred embodiment, TCS 200 performs a procedure for training a model and a procedure for identifying an unidentified class as one of a group of classes. Procedures for training and identifying an unidentified class are discussed below. In the preferred embodiment, TCS 200 is coupled to an external system and provides a low complexity training system and classifier. In another embodiment, TCS 200 is a key element of an access control system wherein TCS 200 provides a training and identification system for controlling access to a system. TCS 200 may be implemented in hardware, software, or a combination of hardware and software; however, TCS 200 is preferably implemented in software.

In the preferred embodiment, TCS 200 is comprised of feature database 202, training processor 204, model database 206, tree-structured classifier 208, class label counter 210, and class selector 212 elements.

Training processor 204 is preferably coupled to feature database 202 via feature vector input 106. Additionally, training processor 204 is coupled to model database 206. Preferably, training processor 204 retrieves feature vectors from feature database 202 and receives feature vectors from an external system via feature vector input 106. In the preferred embodiment, feature vectors stored in feature database 202 represent a group of classes. Preferably, training processor 204 determines models based on feature vectors by performing a training procedure discussed below. When training for models is complete, training processor 204 preferably stores models in model database 206.

In the preferred embodiment, tree-structured classifier (TSC) 208 is primarily comprised of a hierarchy of classifiers. Preferably, each of the hierarchy of classifiers is coupled to an input source via feature vector input 106 and to model database 206 via input 108. Also, each of the hierarchy of classifiers generates an output via class label output 112 and is coupled to class label counter 210.

TSC 208 is configured in a tree structure having a root classifier at the top. A root classifier has no "parent" (e.g., higher level) classifier. Additionally, a root classifier is coupled to "children" (e.g., lower level) classifiers via feature vector output 114.

TSC 208 is also comprised of mid-level classifiers. In the preferred embodiment, mid-level classifiers are classifiers having a single parent classifier and two child classifiers. Preferably, each mid-level classifier is coupled to other classifiers via feature vector output 114. Additionally, the polynomial basis vector could be output from mid-level classifiers to save computation.

TSC 208 is further comprised of terminal classifiers. In the preferred embodiment, terminal classifiers are classifiers having a single parent classifier and no child classifiers. Preferably, each terminal classifier is coupled to other classifiers via feature vector output 114. Although feature vector output 114 is shown as a common line that terminates at multiple other classifiers, separate lines could be shown between a parent classifier and child classifiers.

In the preferred embodiment, a root classifier, mid-level classifier, and terminal classifier are each classifier 100 (FIG. 1). Preferably, primary differences in each of the classifiers is based on the coupling of the classifiers with respect to other classifiers.

In the preferred embodiment, TSC 208 is a balanced tree (e.g., equal number of classifiers for each branch of the tree). Preferably, TSC 208 is comprised of a number of classifiers which is experimentally determined based on the domain (e.g., area) where TSC 208 is used. One embodiment of the present invention uses a total of 7 classifiers for satisfactorily classifying feature vectors associated with sampled speech.

Class label counter 210 preferably receives class labels from terminal node classifiers. In the preferred embodiment, class label counter 210 accumulates class labels associated with classification operations performed by a terminal classifier. Preferably, a terminal classifier is a classifier providing a final classification operation for an unidentified feature vector. Preferably, an output from class label counter 210 is coupled to an input of class selector 212.

Class selector 212 preferably receives a class label for each feature vector classified by TSC 208. In the preferred embodiment, feature vectors classified by TSC 208 are associated with a class label based on classification results. Class labels are accumulated by class label counter 210 and provided to class selector 212. Preferably, class selector 212 identifies a class from a group of classes based on class labels received from class label counter 210.

Figure 3:
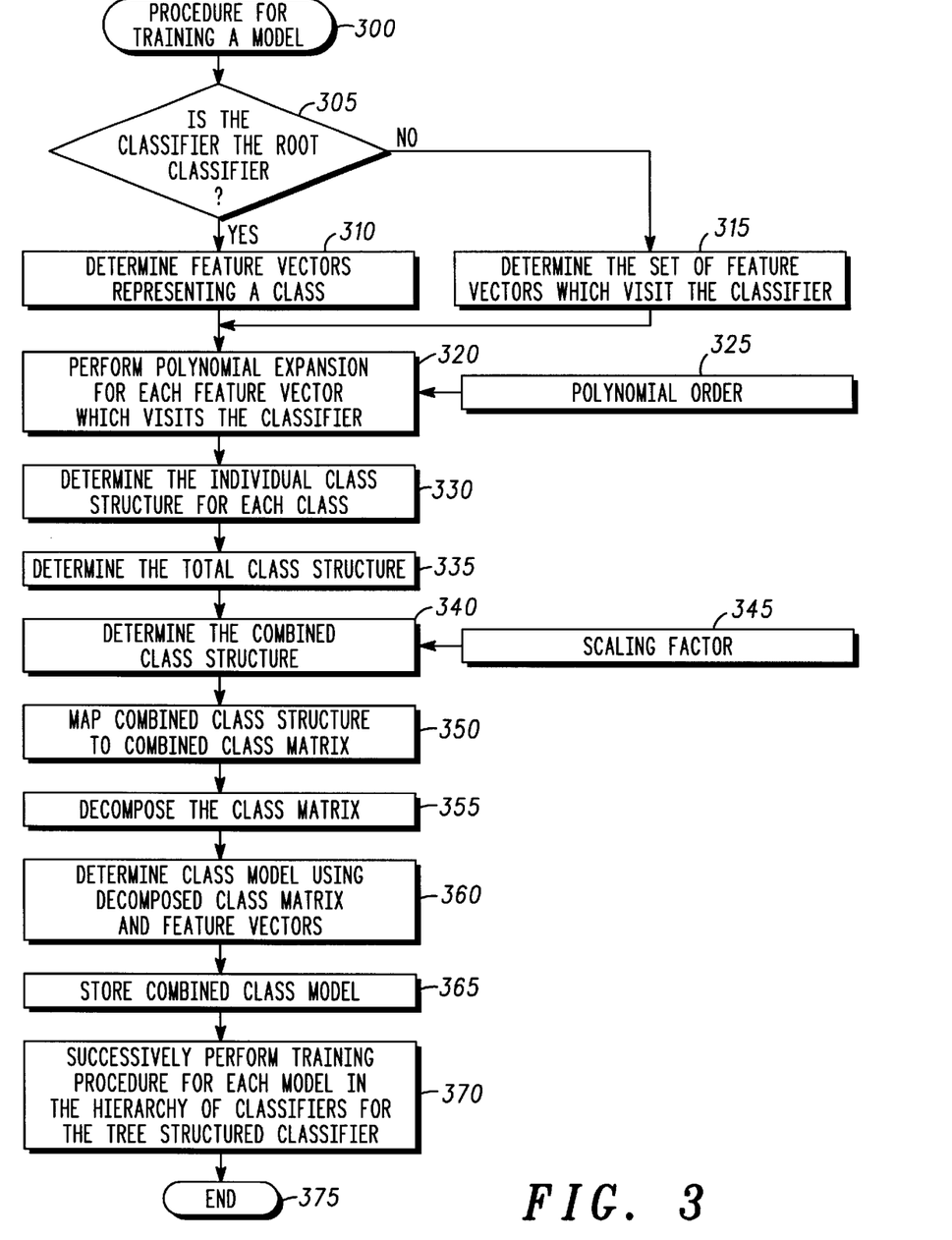
FIG. 3 is a flowchart illustrating a training procedure in accordance with a preferred embodiment of the present invention.
Figure 4:
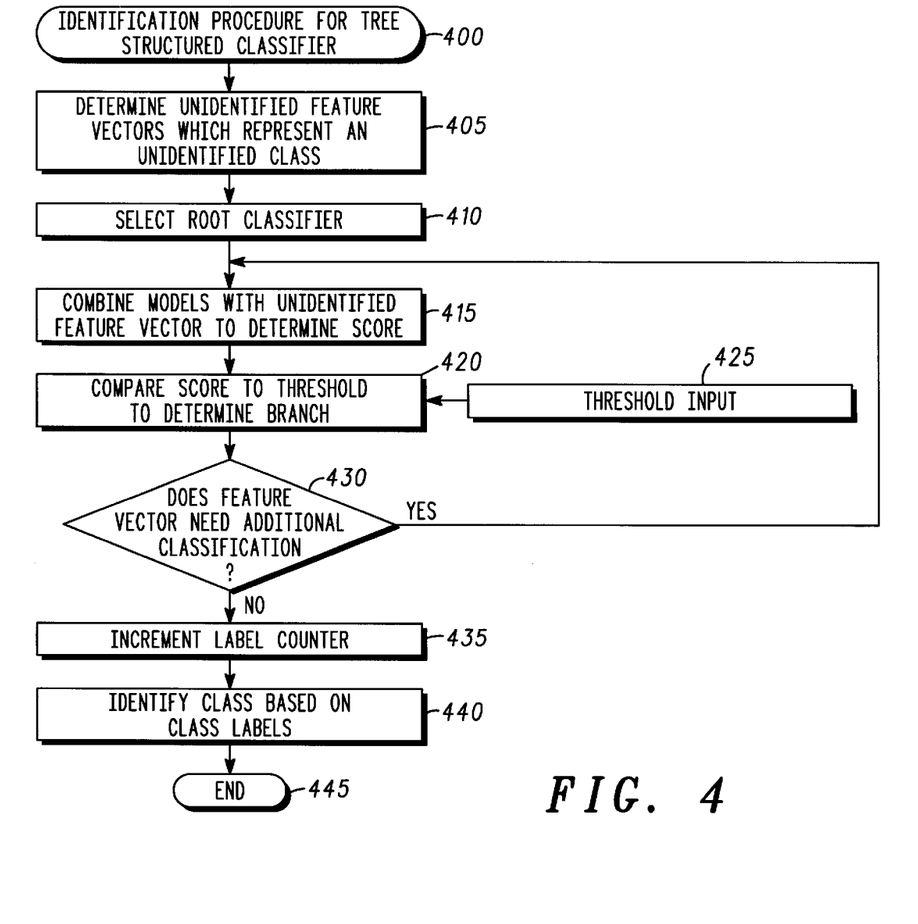
FIG. 4 is a flowchart illustrating an identification procedure in accordance with a preferred embodiment of the present invention.

In a preferred embodiment, TSC 208 is used to perform the procedures described in FIG. 3 and FIG. 4.

FIG. 3 is a flowchart illustrating a training procedure in accordance with a preferred embodiment of the present invention. Procedure 300 (FIG. 3) describes a procedure for training a tree-structured classifier, such as, tree-structured classifier 208 (FIG. 2). In the preferred embodiment, training a tree-structured classifier is accomplished by creating a model for each set of feature vectors which "visits" a classifier. A feature vector is said to visit a classifier (e.g., child classifier) when classification of the feature vector at the parent classifier determines the child classifier to visit next. Preferably, the parent classifier determines the next child classifier to visit by comparing results of a classification (e.g., a dot product producing a score value) with a predetermined threshold value.

In the preferred embodiment, procedure 300 is performed recursively for each "level" of a hierarchy of classifiers. A "level", as used herein, means a collection of classifiers having an ordered relationship with respect to another collection of classifiers. For example, in a tree-structured classifier, a root classifier is at the top "level" of a hierarchy of classifiers.

In task 305, a check is performed to determine when the classifier is the root classifier. In the preferred embodiment, when the classifier to be trained is the root classifier, task 310 is performed. When the classifier to be trained is not the root classifier, task 315 is performed.

In task 310, feature vectors representing a class are determined. In the preferred embodiment, each feature vector in a training set is used to determine a model for a root classifier.

When feature vectors represent speech, feature vectors may be determined, for example, from a speech sample. A set of feature vectors is determined from a series of overlapping windows of sampled speech (e.g., Hamming windows). Preferably, a feature vector is created for each Hamming window, wherein each Hamming window represents a speech sample having the silence removed.

In the preferred embodiment, a linear prediction (LP) analysis is performed and includes generating a predetermined number of coefficients for each Hamming window of the removed silence speech sample. Preferably the number of coefficients for the LP analysis is determined by the LP order. LP orders of 10, 12 and 16 are desirable however other LP orders may be used. The preferred embodiment uses an LP order of 12. Although other numbers of coefficients could be used in alternative embodiments, in the preferred embodiment, task 310 generates 12 coefficients for every Hamming window (e.g., every 10 milliseconds, 30 milliseconds of removed silence speech). The result of task 310 may be viewed as a Z×12 matrix, where Z is the number of rows and 12 (the LP order) is the number of columns. Z is dependent on the length of the removed silence speech sample, and may be on the order of several hundred or thousand. The Z×12 matrix of task 310 may also be viewed as Z sets of LP coefficients. In this example, there are 12 LP coefficients for every Hamming window of the removed silence speech. Each set of LP coefficients represents a feature vector. Additionally, cepstral coefficients and delta-cepstral coefficients are determined from the LP coefficients.

In the preferred embodiment, task 310 includes performing a linear transform on the LP coefficients. Preferably, the linear transformation performed includes a cepstral analysis which separates unwanted from wanted information retaining information important to speech recognition. Performing the cepstral analysis is an optional part of task 310, however, for accurately identifying speech, cepstral analysis should be performed. Determining cepstral coefficients and delta-cepstral coefficients is a process known in the art. The result of performing the cepstral and delta-cepstral analysis may be viewed as a Z×24 matrix where 12 is the cepstral order. The cepstral order may be the same order as the LP order. The collection of feature vectors for the series of Hamming windows is comprised of either the sets of LP coefficients or cepstral and delta-cepstral coefficients associated therewith. The collection of feature vectors representing a spoken command are titled a feature set.

A vector quantization is performed on the cepstral coefficients the feature vectors representing the class. In the preferred embodiment, one purpose of performing vector quantization is to cluster the speech information for each spoken command into a common size matrix representation. Because tasks 310–365 are performed for each class, task 310 may produce a different number of feature vectors for each spoken command because each command may have a speech sample of a different time length. Vector quantization results in a predetermined number of feature vectors for each spoken command. A codebook size input (not shown) is an input to task 310 and represents the number of feature vectors to be determined in task 310.

Alternative to task 310, another embodiment of the present invention uses a fixed codebook (e.g., as used by a vocoder). When a fixed codebook size is used, each feature vector is quantized using the fixed codebook. This alternative embodiment allows indices of predetermined feature vectors to be stored in memory instead of storing feature vectors. Indices are preferably represented as an integer and require less storage space than storing feature vectors representing each class. Indices are used as an index into the codebook where feature vectors are preferably stored. Storing indices instead of feature vectors may be chosen when limiting the amount of memory is preferred over processing performance. When task 310 is complete, task 320 is performed.

In task 315, a set of feature vectors which visit a classifier is determined. In the preferred embodiment, "a classifier" is a child classifier with respect to a parent classifier for a hierarchy of classifiers for task 315. Preferably, a recursive procedure including training a model for a parent classifier, classifying feature vectors using a model for a parent classifier, and determining which feature vectors visit a child classifier is performed. Feature vectors which visit the child classifier are determined by comparing a result (e.g., a score) with a predetermined threshold. Preferably, a score is computed by performing a dot product of a feature vector with a model representing the parent classifier. In the preferred embodiment, when comparing a score with a threshold, scores less than a threshold value associate feature vectors with a child classifier to the left of a parent classifier. Alternatively, scores greater than or equal to a threshold associate feature vectors with a child classifier to the right of the parent classifier. When task 315 is complete, task 320 is performed.

In the preferred embodiment, the top-level classifiers are of low order and the lower-level classifiers are of higher order to decrease computation (e.g., root classifier is linear, child classifiers are second order).

In task 320, a polynomial expansion is performed for each feature vector which visits a classifier. In the preferred embodiment, "a classifier" refers to a classifier which is being trained for task 320. Preferably, when a classifier being trained is a root classifier, feature vectors associated therewith are determined in task 310. Alternatively, when a classifier being trained is other than a root classifier (e.g., mid-level and terminal classifiers), feature vectors associated therewith are determined in task 315.

In the preferred embodiment, feature vectors representing two different classes, for example an "A" and a "B" class, are expanded. "A" and "B" classes may represent, for example, spoken words, different groups of speakers, speech from a single speaker, characteristics of communication channels, fingerprint characteristics, facial characteristics, etc. A high order polynomial expansion is performed for each feature vector representing each class. In the preferred embodiment, the high order polynomial expansion is a fourth order polynomial expansion; although, other polynomial orders are suitable. Preferably, the polynomial order for the high order polynomial expansion performed in task 320 is determined from polynomial order input 325. Desirably, polynomial order input 325 is in the range of 2 to 4 although different ranges could be used. The results of task 320 are viewed as two matrices, for example, a first matrix representing class "A", and a second matrix representing class "B". When the cepstral order is 12 and delta-cepstral coefficients are calculated, the high order polynomial expansion produces a high order matrix, for each class, of dimension codebook size input number of rows and 20,475 columns. Preferably, codebook size input is on the order of tens or hundreds in size. However, other codebook sizes on the order of less than tens and thousands or more are possible.

In task 330, an individual class structure for each class is determined. In the preferred embodiment, an individual class structure is determined by summing the feature vectors of the high order matrix determined in task 320. In the preferred embodiment, an individual class structure is calculated for each class. The result of task 330 is a single vector (e.g., individual class structure) of same dimension as a single vector of the high order matrix. In the embodiment having a high order matrix with the dimensions discussed in task 320, the resultant individual class structure (e.g., vector) has 20,475 elements.

In task 335, a total class structure is determined. In the preferred embodiment, a total class structure represents a collection of classes associated with a model and therefore, a classifier which is being trained. In the preferred embodiment, a summation of each individual class structure is performed to determine the total class structure. Preferably, the summation is performed using individual class structures determined in task 330.

In task 340, a combined class structure is determined. In the preferred embodiment, a combined class structure for a class is determined. In the preferred embodiment, the combined class structure, $r_{A,combined}$, for a class is determined by adding the total class structure (task 335) and a scaled version of an individual class structure associated therewith. For example, when a model is trained for 5 classes (e.g., class 1, class 2, . . . class 5) and class A represents two classes (e.g., class 1 and class 4), the combined class structure representing class A is provided by equation (eqn.) 1, $$r_{A,combined} = r_{total} + ((N_{all}/(N_1+N_4))-2) * r_{A,class}, \quad \text{(eqn. 1)}$$

wherein, $r_{A,combined}$ is the combined class structure for class A, $r_{total}$ is the total class structure determined in task 335 for the combination of all classes being trained (e.g., class 1, class 2, . . . , class 5), $N_{all}$ is a summation of the number of feature vectors representing each class (e.g., the number of feature vectors for class 1, class 2, . . . , class 5), $N_1$ is the number of feature vectors representing class 1, $N_4$ is the number of feature vectors representing class 4, $r_{A,class}$ is the individual class structure for class A determined in task 330. Preferably, scaling factor input 345 represents a scaling factor term (e.g., $((N_{all}/(N_1+N_4))-2)$) in eqn. 1.

In task 350, a combined class structure is mapped to a class matrix. In the preferred embodiment, a matrix representing a class is titled a class matrix. The class matrix for the $A^{th}$ class is represented as, $R_A$. Preferably, the method for mapping a combined class structure, $r_{A,combined}$, to a class matrix, $R_A$ is best illustrated as an example. For example, consider the case of a two element combined class structure, $r_{A,combined}$ in eqn. 2, $$r_{A,combined} = \begin{bmatrix} r_1 \\ r_2 \\ r_3 \\ r_4 \\ r_5 \\ r_6 \end{bmatrix}. \quad \text{(eqn. 2)}$$

The second order expansion (i.e., high order polynomial expansion) for eqn. 2 is provided in eqn. 3, $$r_{A,combined} = p_2(x) = \begin{bmatrix} 1 \\ x_1 \\ x_2 \\ x_1^2 \\ x_1 x_2 \\ x_2^2 \end{bmatrix}. \quad \text{(eqn. 3)}$$

A square class matrix having row and column dimensions is determined by eqn. 4, $$p(x)p(x)^t = \begin{bmatrix} 1 & x_1 & x_2 \\ x_1 & x_1^2 & x_1 x_2 \\ x_2 & x_1 x_2 & x_2^2 \end{bmatrix} = R_A, \quad \text{(eqn. 4)}$$

where $p(x)^t$ represents the transpose of vector $p(x)$.

Therefore, in the preferred embodiment, the mapping of the combined class structure to the class matrix is performed by copying the second order elements (high order polynomial expansion) found in eqn. 3 to the corresponding matrix element in eqn. 4. Again, for example, the $x_1 x_2$ element of eqn. 3 would map to the matrix elements having indices $R_A(3,2)$ and $R_A(2,3)$. The mapping approach described in task 350 can be extended to higher order systems.

In task 355, a class matrix is decomposed. In the preferred embodiment, a class matrix for the $A^{th}$ class is decomposed using Cholesky decomposition. For example, the Cholesky decomposition for $R_A$ is represented in equation form in eqn. 5, $$L_A{}^t L_A = R_A, \quad \text{(eqn. 5)}$$

where $L_A{}^t$ is the transpose of matrix $L_A$ and both matrices are determined using Cholesky decomposition.

In task 360, a class model is determined for a class. In the preferred embodiment, a class model, $W_A$, is determined using back substitution. For example, eqn. 6 can be solved for $W_A$ (e.g., class A model), $$L_A{}^t L_A W_A = ((N_{all}/(N+N_4))-1) * a_A, \quad \text{(eqn. 6)}$$

where $L_A{}^t$, $L_A$, $W_A$, $N_{all}$, $N_1$ and $N_4$ are each described above. Preferably, $a_A$ is a low order class structure for the $A^{th}$ class. In the preferred embodiment, $a_A$ is determined using a method similar to the method for determining the individual class structure (task 330). The polynomial order for the low order class structure is preferably half the polynomial order for the individual class structure. Since the low order class structure elements are also elements of the individual class structure (task 330), the low order class structure may be determined directly from the individual class structure.

In task 365, a class model is stored. In the preferred embodiment, a class model for a class is stored in the class model database. Among other things, the class model database may be random access memory (RAM), commercial third-party database, magnetic storage media such as disk or tape, read-only memory (ROM), and other types of suitable data storage.

In task 370, a training procedure is successively performed for each model in a hierarchy of classifiers for a tree-structured classifier. The procedure then ends 375. In the preferred embodiment, tasks 305–365 are performed for each model at each level in a hierarchy of classifiers.

FIG. 4 is a flowchart illustrating an identification procedure in accordance with a preferred embodiment of the present invention. Procedure 400 (FIG. 4) describes a procedure for identifying an unidentified class as a class of a group of classes.

In the preferred embodiment, identifying an unidentified class is accomplished by classifying each unidentified feature vector representing an unidentified class as a class of a group of classes. Classifying each unidentified feature vector representing the unidentified class is accomplished by multiplying each unidentified feature vector by a model for a root classifier. A product of the multiplying step represents a score associated therewith. Based on the score, identification of the unidentified feature vector preferably continues with one of at least two children classifiers of the root classifier. The child classifier is selected to perform the next multiplying step based on comparing the score value determined at the root classifier (e.g., parent classifier) with a predetermined threshold. Preferably, when the score is less than the threshold, one child classifier is selected and when the score is greater than or equal to the threshold, another child classifier is selected. This procedure is successively performed until a class of a group of classes is determined for each unidentified feature vector. A class associated with the majority of unidentified feature vectors is determined to be the class of the group of classes identifying the unidentified class.

In task 405, unidentified feature vectors which represent an unidentified class are determined. In the preferred embodiment, unidentified feature vectors are determined similar to the procedure for determining feature vectors in task 310 (FIG. 3). Preferably, procedure 400 is performed for each unidentified feature vector representing an unidentified class.

In task 410, a root classifier is selected. In the preferred embodiment, the first classifier which performs an identifying step is the root classifier of a hierarchy of classifiers.

In task 415, a model is combined with an unidentified feature vector to determine a score. In the preferred embodiment, a dot product is performed using a model representing the selected classifier and an unidentified feature vector. Preferably, a dot product is performed for each unidentified feature vector and the model representing the selected classifier.

When initially performing task 415, a model used to perform a dot product is preferably the model associated with the root classifier determined in task 410. Otherwise, the model, and therefore the selected classifier, is determined in a later task (e.g., task 420).

In task 420, a score is compared to a threshold to determine a branch. In the preferred embodiment, a score determined for each unidentified feature vector in task 415 is compared to a predetermined threshold to determine the next classifier to perform task 415.

Preferably, when a score is less than a threshold, a child classifier to the left of the parent classifier in a hierarchy of classifiers is selected. When a score is greater than or equal to the threshold, a child classifier to the right of the parent classifier in a hierarchy of classifiers is selected. When the parent classifier is a terminal classifier, a class label (e.g., class label "A" or "B") associated with the branch (e.g., left or right branch) is determined. For example, when the parent classifier is a terminal classifier, a left branch is associated with a class label and a right branch is associated with another class label. In the preferred embodiment, the threshold is a variable input from threshold input 425. A suitable value for the threshold is 0.5.

In task 430, a check is performed to determine when a feature vector needs additional classification. In the preferred embodiment, a check is performed to determine when each unidentified feature vector needs additional classification. When the parent classifier in task 420 is a terminal classifier, task 435 is performed. When the parent classifier in task 420 is not a terminal classifier, task 415 is performed and the procedure iterates as shown.

In task 435, a label counter is incremented. In the preferred embodiment, a class label counter is incremented based on class labels assigned in task 420. Preferably, a count of class labels is accumulated for each class label associated with each unidentified feature vector.

In task 440, a class is identified based on class labels. In the preferred embodiment, an unidentified class is identified as one class of a group of classes based on a count of class labels determined in task 435. The procedure then ends 445.

Figure 5:
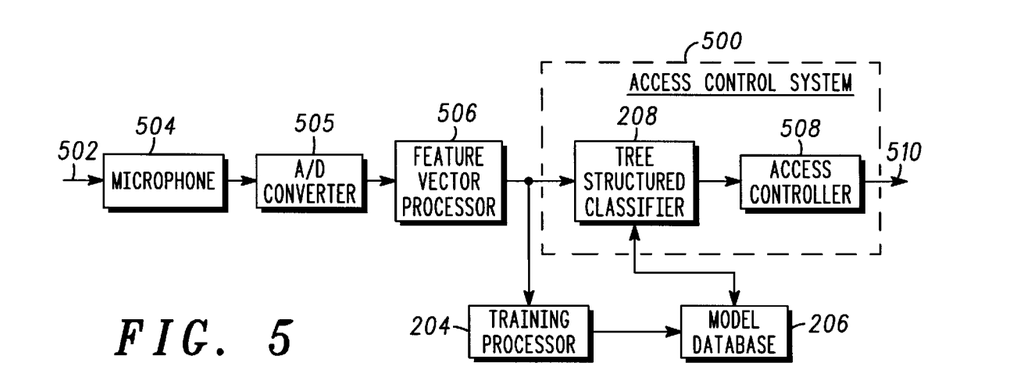
FIG. 5 illustrates an access control system in accordance with a preferred embodiment of the present invention.

FIG. 5 illustrates an access control system in accordance with a preferred embodiment of the present invention. Access control system (ACS) 500 (FIG. 5) illustrates an apparatus for granting access to a device or system. For example, in one embodiment of the present invention, a voice automated banking system includes ACS 500 for granting access to a customer when a real-time speech input of the customer positively compares to a model representing the customer. In another embodiment of the present invention, ACS 500 provides access to a communications device when speech from a user of the communications device positively compares to a model representing the user. ACS 500 could be used in any system which would benefit from accurate classification of an unidentified class. Systems which could benefit from ACS 500 include, for example, security systems, proximity access systems, information access systems, vehicle theft prevention systems, systems allowing operation of equipment including: copiers, faxes, phones, computers pagers, elevators, airplanes, automobiles, heavy machinery, etc.

In the preferred embodiment of the present invention, ACS 500 includes tree-structured classifier (TSC) 208 (FIG. 2) coupled to access controller 508. Preferably, TSC 208 receives feature vector inputs and models from a database. Then, TSC 208 combines feature vector inputs and predetermined models to produce scores associated therewith. Preferably, access controller 508 receives scores from TSC 208 and generates access signal 510 when scores meet a predetermined threshold.

Preferably, feature vectors received by ACS 500 are created by feature vector processor 506. Feature vector processor 506 is a processor coupled to ACS 500 and preferably determines feature vectors using a task similar to task 310 (FIG. 3).

In the preferred embodiment, digital inputs received by feature vector processor 506 are created by analog to digital converter 505. Preferably, analog to digital converter 505 is coupled to feature vector processor 506. Additionally, analog to digital converter 505 is coupled to and receives inputs from microphone 504.

In an alternate embodiment, feature vector processor 506 could operate on digital and analog inputs retrieved from a memory device (not shown).

Another embodiment of the present invention includes ACS 500 with a training system. Preferably, a training system includes training processor 204 and model database 206. Training processor 204 is coupled to feature vector processor 506 and model database 206. Model database 206 is also coupled to TSC 208. A training system is preferably used to train models used by ACS 500 as discussed above.

Thus, what has been shown is a system and method requiring less processing and data storage resources to produce improved classification of an unidentified class. What has also been shown is a system and method having low complexity classifiers to classify an unidentified class as a class of a group of classes. The present invention also provides an improved system and method for granting access to a device or system when a user is identified as an approved user of the device or system.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A wireless communications device having fraud prevention features comprising:

a tree-structured classifier for scoring each of a set of unidentified vectors, the tree-structured classifier comprised of a plurality of classifiers arranged in a hierarchy terminating in terminal classifiers which generate a class label for each unidentified vector of the set;

a class label counter coupled to an output of the tree-structured classifier, the class label counter accumulating class labels received from said terminal classifiers of said hierarchy;

a class selector coupled to an output of the class label counter, the class selector selecting one of the class labels from accumulated class labels provided by the class label counter; and access control means coupled to the class selector for generating an access granted signal for said communications device based on said one selected class.

2. A communications device as claimed in claim 1 further comprising:

a microphone for receiving spoken input and generating a speech output;

an analog to digital converter for receiving said speech output and generating an unidentified input; and a processor for receiving said unidentified input and generating said set of unidentified vectors.

3. A communications device as claimed in claim 2 further comprising:

a training processor for receiving input vectors and training a plurality of models based on said input vectors; and a database for storing said plurality of models.

4. A communications device as claimed in claim 3 wherein said tree-structured classifier includes:

means for combining said input vectors to create a vector representing an unidentified input;

means for scaling said vector to create a scaled version of said vector; and means for computing said plurality of models based on said scaled version of said vector and said input vectors.

5. A communications device as claimed in claim 4 wherein said means for computing further includes:

means for mapping said scaled version of said vector to a matrix;

means for decomposing said matrix into a decomposed version of said matrix; and means for calculating each of said plurality of models using said decomposed version of said matrix, a scaling factor, and said input vectors.

6. A communications device as claimed in claim 5 wherein said communications device is a phone.

7. A communications device as claimed in claim 5 wherein said communications device is a pager.

8. A method of controlling access to a system comprising the steps of:

receiving input vectors for training a plurality of models based on said input vectors;

storing said plurality of models in a model database;

generating, by a feature vector processor, a set of unidentified vectors from an unidentified input;

scoring with a tree-structured classifier each of said set of unidentified vectors using the plurality of models, the tree-structured classifier comprised of a plurality of classifiers arranged in a hierarchy terminating in terminal classifiers which identify one of a plurality of class labels for each unidentified vector of the set;

counting with a class label counter the number of times each class label is identified by the terminal classifiers of said hierarchy;

selecting with a class selector one selected class based on the number of class labels counted by the class label counter; and generating an access granted signal with an access controller based on said one selected class.

* * * * *

UNITED STATES PATENT AND TRADEMARK OFFICE
CERTIFICATE OF CORRECTION

| | |
|---|---|
| PATENT NO. | : 6,243,695 B1 |
| APPLICATION NO. | : 09/045361 |
| DATED | : June 5, 2001 |
| INVENTOR(S) | : Assaleh et al. |

It is certified that error appears in the above-identified patent and that said Letters Patent is hereby corrected as shown below:

On the title page, item (54):

In the Title delete "ACCESS CONTROL SYSTEM AND METHOD THEREFOR" and add --TELECOMMUNICATION DEVICE HAVING FRAUD PREVENTION FEATURES--.

In claim 8, column 12, delete entire claim.

Signed and Sealed this

Thirteenth Day of March, 2007

JON W. DUDAS
*Director of the United States Patent and Trademark Office*